Patented Nov. 29, 1938

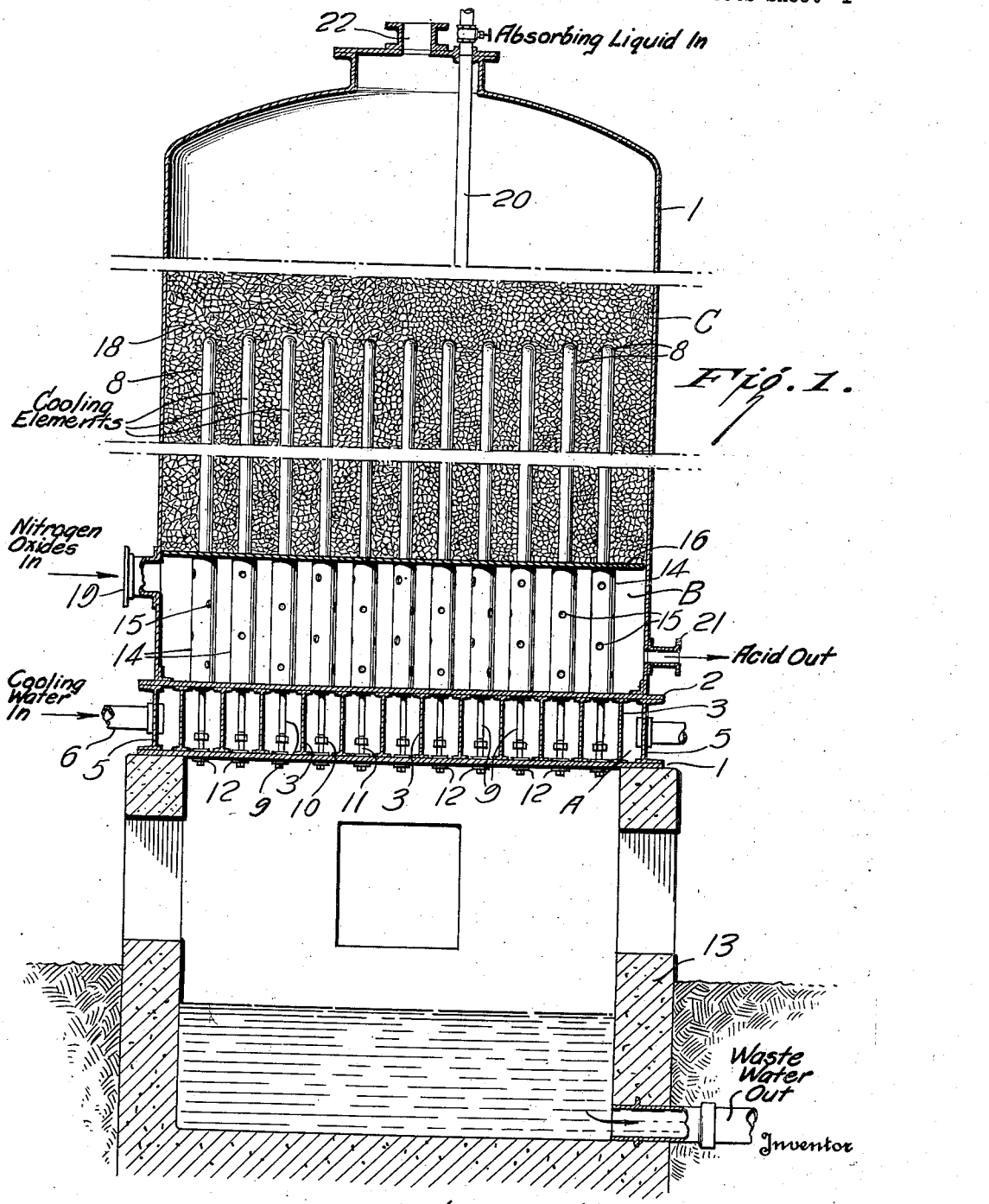

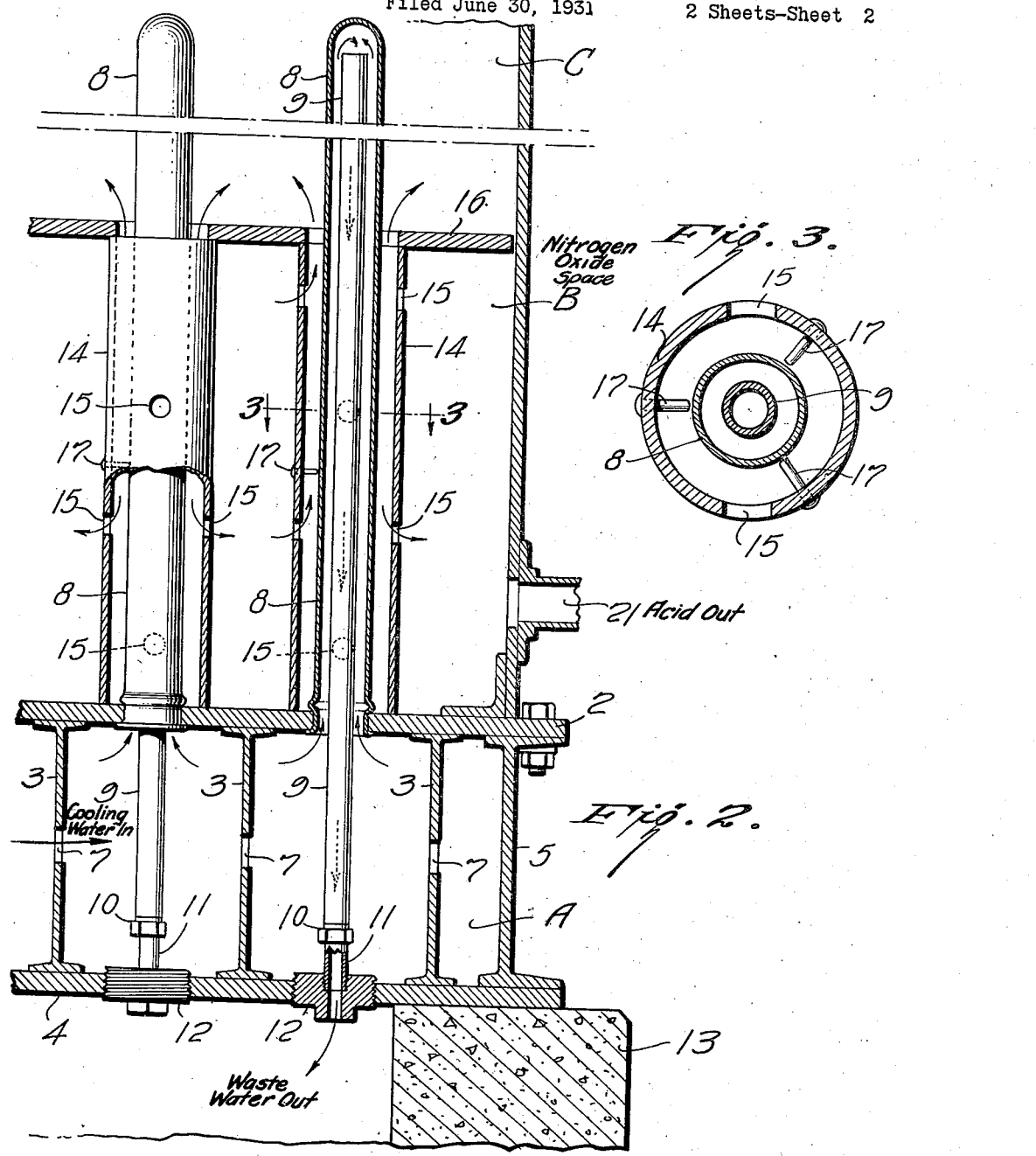

2,138,165

UNITED STATES PATENT OFFICE 2,138,165

METHOD OF AND APPARATUS FOR ABSORBING OXIDES OF NITROGEN UNDER PRESSURE

Ingenuin Hechenbleikner, Charlotte, N. C., assignor to Chemical Construction Corporation, New York, N. Y., a corporation of Delaware Application June 30, 1931, Serial No. 547,803

11 Claims. (Cl. 23—160)

This invention relates to a method and apparatus for the manufacture of nitric acid by the absorption of oxides of nitrogen, preferably, though not necessarily, under pressure. The principal object of the invention is to provide a more economical and efficient method and apparatus for the absorption of the oxides of nitrogen to produce nitric acid by contacting the absorbing liquid with the said oxides under pressure.

Another important object of the invention is the provision of a pressure tower containing actually but a single contacting chamber, but which for all practical purposes contains many smaller compartments wherein the absorbing liquid may contact with the gas to be absorbed, the latter being under pressure, while at the same time providing means for cooling the resultant liquid and absorbed gas.

In the preparation of nitric acid, it has been heretofore proposed to contact water or dilute nitric acid with oxides of nitrogen, the latter being under atmospheric pressure in a series of absorbing towers or the like, but this prior practice has found it necessary to pass the gases through a plurality of such towers in order to secure optimum efficiency. This prior practice has utilized towers of acid-proof brick or the like, with the result that it has not been possible heretofore to carry out the operation under sufficient pressure to secure maximum efficiency.

Subsequently to the above practice, it has been proposed to contact the water and oxides of nitrogen in a contact apparatus constituting but a single tower of a material such as chrome steel, which will withstand the desired pressure. This tower, however, was particularly complicated and expensive in that it was found necessary to provide interior baffles, shelves, bubble cap arrangements and the like so as to insure efficient contact between the gases and the liquid.

It is, therefore, one of the important objects of the invention to provide a comparatively simple and inexpensive apparatus of requisite material which will permit of the contacting and reaction between the absorbing liquid and absorbed gases under pressure. It has been found by actual practice that operation of such a device as above set forth makes unnecessary the use of more than a single tower, while at the same time producing a reaction product of desirable concentration.

In practicing the invention in one of its preferred forms, there is provided an absorption chamber comprising an acid-proof shell preferably of such material as chrome steel, including a single absorption chamber, containing a packing of acid-proof material such as quartz aggregates. Embedded within this packing material are a series of heat exchange devices, preferably consisting of concentrically arranged tubes for the reception and discharge of cooling medium such as water. An inlet is provided at the lower portion of the contact or absorption chamber for the reception of the gases, e. g. in case of nitric acid, oxides of nitrogen which pass upwardly under pressure through the packing and meet a stream of water moving countercurrent thereto through the packing. The gases being under pressure, maximum absorption takes place, and due to the fact that there are a series of heat exchange devices embedded in the packing, any undue rise of temperature is prevented, due to the exothermic reaction and hence maximum concentrations are secured. The reaction product flows out of the bottom of the contact chamber under suitable control and the cooling water is likewise vented at the bottom of the apparatus, where it passes to waste or to a suitable device for cooling the same, if it is desired for re-use.

The invention further consists in the novel arrangement, combination and construction of parts in, and the method of operating, the hereindescribed apparatus.

In the drawings:

Fig. 1 shows a sectional elevation through a device embodying the invention.

Fig. 2 is an enlarged sectional detail of a portion of the apparatus of Fig. 1.

Fig. 3 is a sectional plan view along the line 3—3 of Fig. 2.

Referring now with particularity to the embodiment illustrated as applied to the production of nitric acid, I have shown at 1 a shell or casing composed preferably of chrome steel and at any event of a material which is substantially unattacked by nitric acid but which may withstand the requisite amount of pressure. This shell or casing is suitably mounted upon a bottom plate 2 supported by a series of I beams 3 which rest upon a base 4. The end I beams 5 are suitably curved so as to constitute side walls of a lowermost chamber A. This chamber A is adapted to receive the cooling medium such as water, which enters through the pipe 6. The supporting I beams 3 contain apertures as at 7 to permit distribution of the water therethru.

Crimped into the bottom plate 2 or otherwise secured thereto is a tubular element 8 which rises an appreciable distance into the shell 1 and is provided with a closed top. Concentrically arranged within the tubular element 8 is an inner pipe 9 preferably of rubber with or without reinforcing, spaced from the former, having an open top, its lower portion extending downwardly to connect by means of a coupling 10 with a nipple 11 secured in a plug 12 held in the lower plate 4. By means of these instrumentalities the cooling water entering through the inlet 6 flows through the chamber A, passes upwardly as shown by the arrows in Fig. 2 between the cylindrical element 8 and the inner pipe 9 and downwardly through the latter, being discharged out of the end of the element 12 into the receiver 13. From this point, the heated cooling medium may be discharged to waste, or it may be cooled and re-used again as desired.

Mounted upon the top of the bottom plate 2 is a spacer sleeve 14 perforated as at 15, upon the top of which rests an apertured plate 16. It is to be noted that the spacer sleeve 14 is suitably spaced from the cylindrical element 8 and this relationship is maintained by means of a series of rivets 17 or the like projecting inwardly from the sleeve to a point in proximity to the cylindrical element 8.

Upon the top of the plate 16 there is supported a quantity of packing aggregates indicated generally at 18, which may consist preferably of irregular pieces of quartz approximately ¼ inch in diameter, though obviously other equivalent material may be used. This packing produces the effect of an infinite number of absorption compartments, and as shown, this packing extends a considerable distance above the tops of the heat exchange units, the latter being entirely embedded above the plate 16 in the packing.

The chamber B located between the plates 2 and 16 is provided with a gas inlet as at 19, the gas passing through the perforations 15 in the spacers 14 and upwardly into the absorption chamber C.

An absorbing liquid, which may be either dilute nitric acid or water, enters the absorption chamber through the pipe 20 and flows downward over the packing 18 where it meets the on-coming gas and makes contact therewith in a countercurrent manner. This contact causes absorption of the gas in the liquid and in the event that the gas consists of oxides of nitrogen with the production of nitric acid in an exothermic reaction. This acid is maintained at the desired low temperature through heat exchange contact with the cooling elements and flows down between the spacers 14 and the cylindrical elements 8 of the cooling units, maintaining its heat exchange relationship thereto, and out of the exit 21. Thus the produced acid while at its lowest temperature, contacts with the incoming gases to absorb more thereof and raise the acid concentration. This exit is suitably provided with valves or control means so as to maintain the pressure within the absorber at the desired figure. This nitric acid may then be conducted to suitable concentrators or storage devices as desired. In like manner the absorbing liquid inlet 20 may likewise be provided with suitable valves to control the flow and pressure thereof. The unabsorbed gases are vented through the port 22 in the top of the absorbing shell provided with suitable valves for the maintenance of the desired pressure within the apparatus, for further disposition as desired.

The above apparatus has many desirable features over the ordinary series of brick or acid-proof refractory towers commonly used for the production of nitric acid, or the single pressure tower above referred to.

That pressure is desirable in making contact between the gases and liquid in the production of nitric acid is, of course, well known. Operating a nitric acid absorber under pressure necessarily permits the decrease in size or volume of such unit, the absorption of the gas in the absorbing liquid is hastened and a higher concentration of acid may be produced. For instance, in an absorber operating at atmospheric pressures, it is not possible to secure greater than 50% concentration of nitric acid, whereas operating under pressure, a concentration of 65% may be secured.

The principal advantages of the present apparatus over prior efforts are that no complicated interior mechanism is required in the absorption chamber, no interior baffles or shelves for causing intimate contact between the two reactants, such as the bubble cap assemblies above referred to, being required. The fact that the filling material for packing constitutes loose aggregates, facilitates removal thereof when desired for cleaning or replacement, without tearing down the entire equipment as would be necessary where baffles, shelves or bubble cap assemblies are used. With the pressure processes heretofore employed, and in view of the increased amount of heat produced during the process, due to pressure, it has been necessary to cool the produced acid in one or more stages. This has required in some cases removing the acid from the absorption chamber or chambers for the purpose of cooling and then returning the same for further production or concentration of acid. With the present arrangement, the heat exchange devices being embedded directly in the packing, the nitric acid is cooled to the requisite low temperature as formed, expeditiously and efficiently.

The contact or absorption chamber being constructed as a shell without permanent interior division walls, the entire unit may be initially constructed at minimum expense and readily torn down, repaired or rebuilt, with minimum effort and expense.

Another important advantage resides in the fact that each of the cooling units is independent of the other, so that by suitable manipulation any individual tube may be inspected for leaks and removed, repaired or replaced as desired without affecting the operation of the remainder of the apparatus.

It is to be noted that due to the arrangement of the superimposed cooling medium inlet chamber and the gas inlet chamber, and the fact that there is a common dividing wall between these two compartments, an efficient heat exchange relationship may exist between the two. As a result, not only is the incoming gas maintained at a desirable low temperature by contact with the cooling units, but the finished product, which may be nitric acid, fills the gas inlet chamber to the level of the liquid exit port in that chamber and rests upon the bottom plate which is in direct contact with the cooling water contained in the chamber directly below it. Thus, the produced nitric acid is maintained at a desirable low temperature from the point of its formation within the absorption chamber until it leaves the apparatus. There is, therefore, no opportunity for distillation or vaporization of this acid from exothermic heat and as a result, maximum concentrations may be produced.

In operating the above device for the production of nitric acid, it is preferable to use gases containing as high a concentration of nitrogen oxides as possible, and water as the absorbing medium. Under ordinary conditions the temperature of the contacting gas and liquid should be maintained below 90° F., and preferably as much lower as possible. This temperature may be very readily secured and maintained by means of the heat exchange units contained in both the gas inlet and the absorption compartments. When operating the absorber under from 15 to 20 lbs. pressure, while maintaining the above temperature, nitric acid of a concentration of from 55% to 65% may be readily produced. While the above pressure has been indicated as a desirable one, yet obviously higher pressures may be utilized with proportionate advantages, it only becoming necessary to design a tower of such proportions and strength of material as will withstand the higher pressures used.

While the invention has been described with particularity as applied to the production of nitric acid, yet obviously the invention is not to be limited thereto as the same apparatus and method may be advantageously used for the production of other materials through the absorption step. The invention is, therefore, to be construed broadly and limited only by the scope of the claims.

I claim:

1. A method of making nitric acid which comprises flowing water and gases containing oxides of nitrogen in a countercurrent manner through an absorption chamber, the incoming gases to be absorbed being initially cooled by making contact with a heat exchanger prior to their entry into the absorption chamber, and cooling the resultant nitric acid by flowing the same over the said heat exchanger.

2. An absorption apparatus comprising an absorption chamber, a gas inlet chamber, a cooling water inlet chamber and a waste chamber for the reception of the heated cooling medium, all of the said chambers being superimposed in the order named, the gas inlet chamber communicating with the absorption chamber with means in the latter to discharge spent unabsorbed gases therefrom, means through which the heated cooling medium is discharged, the absorbent liquid after contact with the gas passing into the gas inlet chamber and means to discharge the liquid from said chamber.

3. An absorption apparatus comprising an absorption chamber having a plurality of independent heat exchange units therein, said units being embedded in aggregate so as to form interstices therebetween, an apertured plate constituting the bottom of the absorption chamber and upon which the aggregate rests, said heat exchangers passing through the apertures in said plate and being spaced from the walls of the aperture, whereby incoming gas and outgoing liquid may pass countercurrent to each other between the walls of the apertures and the exterior of the heat exchangers, and means to pass gas and liquid through the absorption chamber in a countercurrent manner.

4. An absorption apparatus comprising an outer closed shell having a bottom wall, an apertured plate intermediate the top and bottom of said shell forming an absorption chamber above the plate and a gas inlet chamber below the plate, and a heat exchanger passing through the aperture in the plate and spaced from the walls of said aperture and into the absorption and gas inlet chambers, and means to flow gas and liquid in a countercurrent manner between the walls of the aperture and the heat exchanger and through the absorption chamber.

5. An absorption apparatus comprising an outer closed shell having a bottom wall, an apertured plate intermediate the top and bottom of said shell forming an absorption chamber above the plate and a gas inlet chamber below the plate, a heat exchanger passing through the aperture in the plate and spaced from the walls of said aperture and into the absorption and gas inlet chambers and a cooling medium inlet chamber below the gas inlet chamber operatively connected to the heat exchanger, and means to flow gas and liquid in a countercurrent manner between the walls of the aperture and the heat exchanger and through the absorption chamber.

6. An absorption apparatus comprising an outer shell having a bottom an absorption chamber having a plurality of independent heat exchange units therein, said units being embedded in aggregate so as to form interstices therebetween, an apertured plate constituting the bottom of the absorption chamber and upon which the aggregate rests, said plate resting upon tubular perforated spacers which in turn rest upon the shell bottom, said heat exchangers passing upwardly through the gas inlet chamber inside the spacers, through the apertures in the plate and into the absorption chamber, means to continuously flow gas and liquid through the absorption chamber in a countercurrent manner, and means to discharge the resultant liquid product from the gas inlet chamber.

7. A process for the production of an acid by the absorption of a gas in a liquid which consists in making the liquid trickle through a layer of filler bodies, and then in contact with a bundle of cooled vertical tubes, contacting the liquid on its way with counter streaming gases to be absorbed, the gases thus being absorbed in the liquid, and leading off the acid thus obtained.

8. An absorption tower for absorbing a gas in a liquid with consequent production of a concentrated acid comprising means for introducing the liquid, means through which the resulting acid may be withdrawn, means through which the waste gases may be withdrawn, an absorption chamber provided with means for distributing the absorption liquid, and below the absorption chamber, a cooling chamber comprising a bundle of vertical tubes inserted in a false bottom, means for cooling these tubes, and means for introducing gases containing the material to be absorbed into the tower and into contact with the cooled tubes.

9. The absorption tower of claim 8 in which the distributing means are filler bodies.

10. A process for the production of acid by the absorption of a gas in a liquid which consists in making the liquid trickle through a layer of filler bodies and in contact with a bundle of cooled vertical tubes, contacting the liquid on its way with counter streaming gases to be absorbed, the gases thus being absorbed in the liquid and leading off the acid thus obtained.

11. A process for the production of an acid by the absorption of a gas in a liquid which comprises making the liquid trickle through a layer of filler bodies and then downwardly through a plurality of conduits and over the surface of a bundle of cooled vertical tubes, at the same time passing the gases to be absorbed upwardly through the conduits and through the layer of filler bodies, the gases thus being absorbed in the liquid and leading off the acid thus obtained.

INGENUIN HECHENBLEIKNER.